United States Patent
Higuchi et al.

(10) Patent No.: US 11,931,936 B2
(45) Date of Patent: Mar. 19, 2024

(54) SYSTEM OF MANUFACTURING INJECTION MOLDED ARTICLE AND METAL MOLD

(71) Applicant: DENSO CORPORATION, Kariya (JP)

(72) Inventors: Tohru Higuchi, Kariya (JP); Masato Ichikawa, Kariya (JP); Tsuyoshi Arai, Kariya (JP); Jun Hasebe, Kariya (JP); Atsushi Kawamura, Kariya (JP); Tomoyoshi Murata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/901,927

(22) Filed: Sep. 2, 2022

(65) Prior Publication Data

US 2022/0410453 A1    Dec. 29, 2022

Related U.S. Application Data

(62) Division of application No. 16/561,102, filed on Sep. 5, 2019, now abandoned.

(30) Foreign Application Priority Data

Sep. 11, 2018    (JP) .................................. 2018-169487

(51) Int. Cl.
    *B29C 45/27*    (2006.01)
    *B29C 45/16*    (2006.01)

(52) U.S. Cl.
    CPC .......... *B29C 45/2701* (2013.01); *B29C 45/16* (2013.01)

(58) Field of Classification Search
    CPC ...... B29C 45/2701; B29C 45/17; B29C 45/16
    See application file for complete search history.

(56) References Cited

U.S. PATENT DOCUMENTS

| 3,026,567 A | 3/1962 | Scott, Jr. et al. |
| 3,103,039 A * | 9/1963 | Robinson ................ B29C 45/27 |
| | | 425/549 |

(Continued)

FOREIGN PATENT DOCUMENTS

| JP | H09-052256 A | 2/1997 |
| JP | H0952256 A * | 2/1997 ......... B29C 45/1606 |

(Continued)

OTHER PUBLICATIONS

Machine translation JPH0952256A (Year: 1997).*

(Continued)

*Primary Examiner* — Jacob T Minskey
*Assistant Examiner* — Wayne K. Swier
(74) *Attorney, Agent, or Firm* — Harness, Dickey & Pierce, P.L.C.

(57) ABSTRACT

In an injection process, molten resin is successively injected from a first flow channel and a second flow channel connected with each other in order into a cavity of a metal mold. High-temperature resin existing in the first flow channel is injected in advance into the cavity as a part of a single shot of molten resin to later form a skin layer of a molded article. Other low temperature resin near a flowable limit existing in the second flow channel is subsequently injected into the cavity as another part of the single shot of molten resin to later form a core layer of the molded article. A low temperature resin remaining in the first flow channel when injection is completed is warmed to be a high-temperature resin before the next cycle, thereby allowing successive molding of molded articles.

2 Claims, 8 Drawing Sheets

(56) References Cited

U.S. PATENT DOCUMENTS

| | | | |
|---|---|---|---|
| 4,031,176 A | | 6/1977 | Molbert |
| 4,108,956 A | * | 8/1978 | Lee .................... B29C 45/2806 |
| | | | 425/572 |
| 4,451,224 A | * | 5/1984 | Harding .............. B29C 45/2725 |
| | | | 425/572 |
| 2001/0036492 A1 | | 11/2001 | Wright et al. |
| 2007/0104826 A1 | | 5/2007 | Keck et al. |
| 2008/0088047 A1 | | 4/2008 | Trudeau |
| 2008/0093772 A1 | | 4/2008 | Armstrong et al. |
| 2009/0014439 A1 | | 1/2009 | Kim |
| 2010/0133721 A1 | | 6/2010 | Armstrong et al. |
| 2012/0003343 A1 | | 1/2012 | Armstrong et al. |
| 2014/0117576 A1 | | 5/2014 | Hanaoka et al. |
| 2016/0005946 A1 | | 1/2016 | Grishin et al. |
| 2020/0078997 A1 | | 3/2020 | Higuchi et al. |

FOREIGN PATENT DOCUMENTS

| | | |
|---|---|---|
| JP | 2008114588 A | 5/2008 |
| JP | 2009-528190 A | 8/2009 |
| JP | 2010-505665 A | 2/2010 |
| JP | 2013-006370 A | 1/2013 |
| WO | WO-2007/149021 A1 | 12/2007 |

OTHER PUBLICATIONS

U.S. Appl. No. 16/561,102, filed Sep. 5, 2019, Higuchi et al.
Spritzgießen von Polyoxymethylen (POM) Plastverarbeiter 54. Jahrg. (2003) Nr4 with English translation.

\* cited by examiner

SYSTEM OF MANUFACTURING INJECTION MOLDED ARTICLE AND METAL MOLD

CROSS-REFERENCE TO RELATED APPLICATION

This patent application is a divisional of U.S. patent application Ser. No. 16/561,102, filed Sep. 5, 2019, which application is based on and claims priority to Japanese Patent Application 2018-169487, filed on Sep. 11, 2018 in the Japan Patent Office, the entire disclosure of which is hereby incorporated by reference herein.

BACKGROUND

Technical Field

Embodiments of this disclosure relate to a system of manufacturing an injection molded article and a metal mold.

Related Art

In a known manufacturing system of manufacturing an injection-molded article, multiple shots of molten resin are supplied from multiple sources and are sequentially injected into a cavity.

In recent years, in a process of manufacturing injection molded articles, it is demanded that a molding cycle is further shortened. In this point of view, a known equipment disclosed in the first patent literature has room for improvement, because it cannot sufficiently shorten the molding cycle.

Various embodiments of the present disclosure have been made in view of the above-discussed problem, and a purpose thereof is to provide a novel system of manufacturing injection-molded articles and a metal mold capable of effectively shortening a molding cycle.

SUMMARY

Accordingly, one aspect of the present disclosure provides a novel system of manufacturing injection molded articles. That is, in a mold injection process of injecting molten resin into a cavity of a metal mold, high temperature molten resin having a given temperature is injected in advance as a part of a single shot of molten resin into a cavity to later form a skin layer of an injection-molded article. Other molten resin having a low temperature near a flowable limit is subsequently injected into the cavity as another part of the single shot of molten resin to later form a core layer of the injection-molded article.

Another aspect of the present disclosure provides a novel metal mold that includes a flow channel to guide low temperature resin (herein below referred to as a low temperature flow channel section) and a flow channel to warm the low temperature resin (herein below referred to as a high temperature flow channel section). The high temperature flow channel section includes a first flow channel located right before a cavity of a metal mold to warm molten resin injected in an early stage as a part of a single shot of molten resin until a high temperature to later form a skin layer of an injection molded article. The low temperature flow channel section includes a second flow channel connected to the first flow channel to retain heat of molten resin injected after the early stage as another part of the single shot of molten resin at a low temperature near the flowable limit to later form a core layer of the injection molded article.

According to the above-described manufacturing system and the metal mold, by setting temperature of the molten resin that later forms the core layer of the injection molded article to a low level near the flowable limit, a time for solidifying the molten resin after it is injected into the cavity can be reduced. Hence, a molding cycle can be shortened. Further, by setting temperature of the molten resin that later forms the skin layer of the injection-molded article to a higher level and thereby lowering melt viscosity thereof, generation of an injection molded article having a defective appearance can be suppressed.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
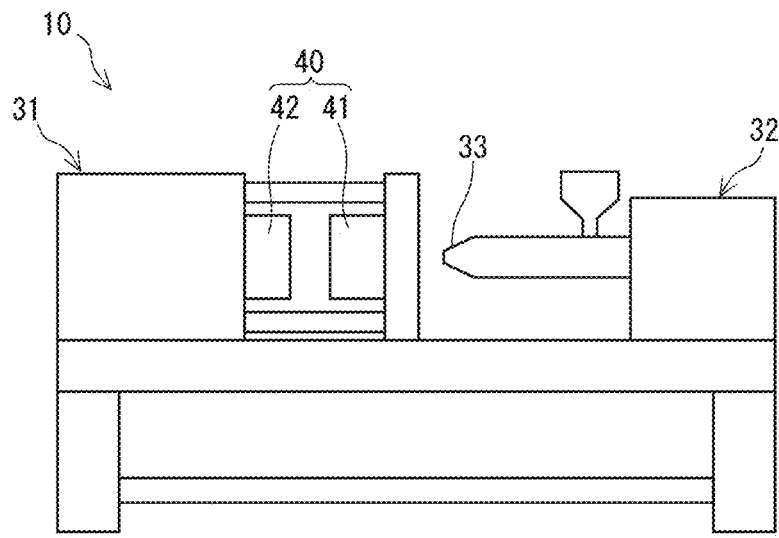
FIG. 1 is a diagram illustrating an exemplary general view of an injection molding machine with a metal mold structure according to a first embodiment of the present disclosure.

Referring now to the drawings, wherein like reference numerals designate identical or corresponding parts throughout the several views thereof, and in particular to FIG. 1, an injection molding machine 10 is provided to manufacture a molded article by performing injection molding. The injection molding is a system to obtain a molded article (i.e., an injection molded article) by injecting molten material into a metal mold 40 and cooling and solidifying the molten material.

The injection molding machine 10 includes a mold fastening section 31 and an injection section 32. The injection section 32 heats and melts resin material and injects a melting result into the metal mold 40. (Hence) The injection section 32 includes a molten resin supply source. The injection section 32 controls injection speed when resin flows thru the metal mold 40 and controls pressure when the metal mold 40 has been filled with the resin. The mold fastening section 31 opens and closes the metal mold 40 and removes the molded article therefrom or the like. The metal mold 40 includes a fixed mold 41 and a movable mold 42 and is installed in the mold fastening section 31.

Figure 2:
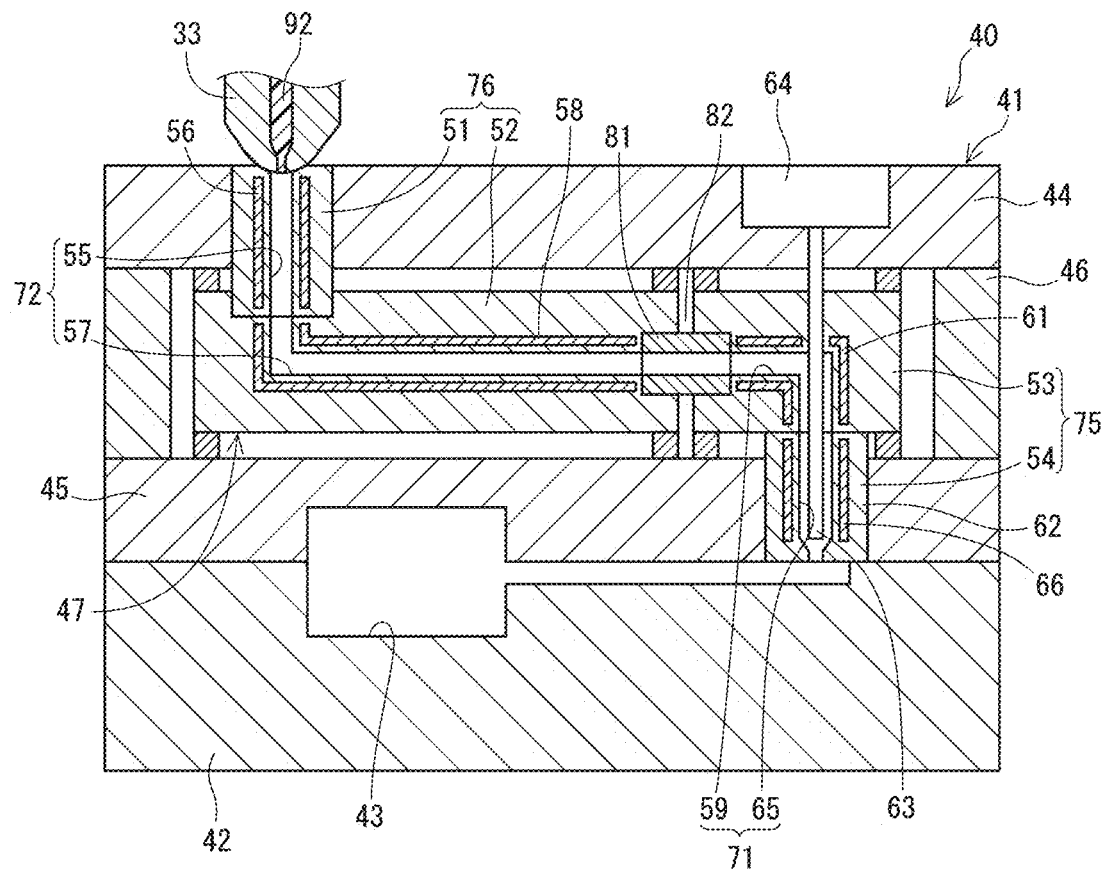
FIG. 2 is a cross-sectional view illustrating the metal mold of the first embodiment of the present disclosure.

As illustrated in FIG. 2, a cavity 43 is formed between the fixed and movable molds 41 and 42 as a space. Resin filled into the cavity 43 becomes a molded article when it is solidified therein. The movable mold 42 is disposed to be able to approach and separate from the fixed mold 41. Thus, the metal mold 40 can be opened when the movable mold 42 is separated from the fixed mold 41 and closed when the movable mold 42 approaches the fixed mold 41. In FIG. 2, the metal mold 40 is in a closed state.

The fixed mold 41 includes a mounting plate 44 located on a side of the injection section 32, a plate 45 to form a cavity 43 between itself and the movable mold 42, and a spacer block 46 sandwiched between the mounting plate 44 and the plate 45. The fixed mold 41 also includes a hot runner unit 47 mounting over the mounting plate 44 to the plate 45. These devices other than the hot runner unit 47 can adopt other known suitable configurations.

The hot runner unit 47 constitutes a flow channel ranging from a nozzle 33 of the injection section 32 to the cavity 43 to keep molten resin melted therein. In this embodiment of the present disclosure, the hot runner unit 47 includes a sprue 51, a heat retention manifold 52, and a warming manifold 53. The hot runner unit 47 also includes a gate 54.

The sprue 51 is attached to the mounting plate 44 and is connected to the nozzle 33. The sprue 51 includes a sprue flow channel 55. A sprue heater 56 is provided in the sprue 51. The heat retention manifold 52 is located between the mounting plate 44 and the plate 45 and is connected to the sprue 51. The heat retention manifold 52 includes a heat retention flow channel 57. The heat retention manifold 52 includes a heat retention heater 58.

Molten resin injected from the injection section 32 has a low temperature TL. Herein below, molten resin having has a low temperature TL is referred to as low temperature resin 92. The sprue heater 56 and the heat retention heater 58 are set to the low temperature TL or similar temperature. Hence, the sprue 51 and the heat retention manifold 52 keep the low temperature resin 92 injected from the injection section 32 warm at the low temperature TL. The low temperature TL is near a flowable limit temperature and is lower than a temperature TN of molten resin injected into the cavity when an ordinary injection molding operation is performed (herein below, referred to as a normal temperature TN).

The warming manifold 53 is located between the mounting plate 44 and the plate 45 and is connected to the heat retention manifold 52. The warming manifold 53 includes a warming flow channel 59. The warming manifold 53 is provided with a warming heater 61. The gate 54 is a valve gate and includes a valve body 62 disposed on the plate 45, a valve pin 63, and a driving section 64 to drive the valve pin 63. The valve body 62 is connected to the warming manifold 53 and includes a valve flow channel 65. The valve pin 63 is enabled to open and close a connection hole connecting the valve flow channel 65 with the cavity 43. The valve body 62 is provided with a valve heater 66.

Figure 3:
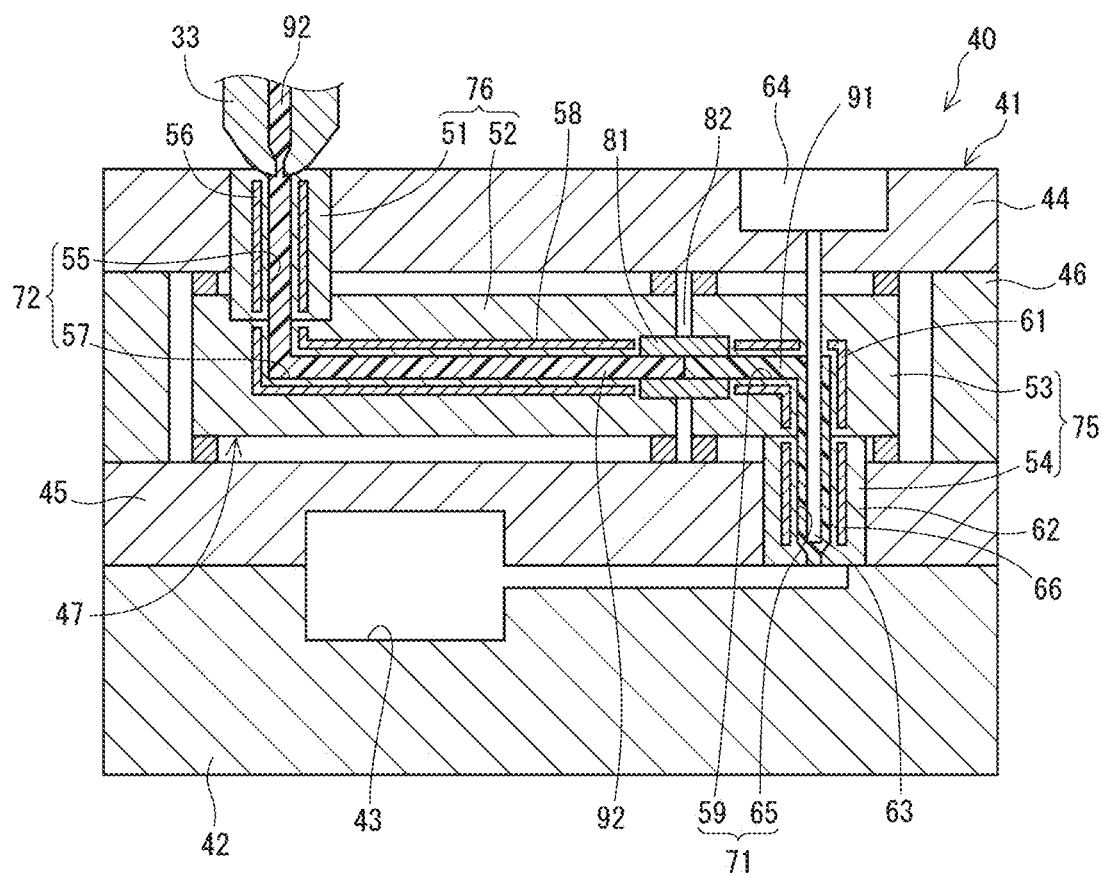
FIG. 3 is a cross-sectional view illustrating the metal mold of the first embodiment of the present disclosure when molten resin is supplied to a flow channel.

Each of the warming heater 61 and the valve heater 66 is set to a high temperature TH higher than the low temperature TL. The warming heater 61 and the valve heater 66 warm molten resin remaining in the warming flow channel 59 and the valve flow channel 65 until the high temperature TH. The high temperature TH is usually higher than an ordinary molding temperature TN, and is lower than either a resin color change temperature or a resin decomposition temperature. Herein below, molten resin warmed until the high temperature TH is referred to as high-temperature resin 91. In FIG. 3 and following drawings, to distinguish the high-temperature resin 91 and the low temperature resin 92 from each other, a hatching pattern therefor is differentiated. However, the high-temperature resin 91 and the low temperature resin 92 are basically the same resin with each other.

The warming flow channel 59 and the valve flow channel 65 collectively constitute a first flow channel 71 located just before the cavity 43. The warming manifold 53 and the gate 54 collectively constitute a high temperature flow channel section 75. As illustrated in FIG. 3, the high temperature flow channel section 75 is enabled to warm molten resin injected in an early stage as a part of a single shot of molten resin to later form a skin layer (i.e. a surface layer section) of a molded article until the high temperature TH. Here, a capacity of high-temperature resin 91 is desirably equal to or more than a product obtained by calculating the below described formula:

Capacity of Single shot×6/Maximum Thickness× Thickness of Skin Layer.

Here, since it varies depending on a type of resin, temperature and a time for filing thereof, the thickness of the skin layer is set accordingly.

The sprue flow channel 55 and the heat retention flow channel 57 collectively constitute a second flow channel 72 connected to the first flow channel 71. The sprue 51 and the heat retention manifold 52 collectively constitute a low temperature flow channel section 76. The low temperature flow channel section 76 is partially enabled to retain heat of molten resin injected after the early stage as another part of the single shot of molten resin to later form a core layer (i.e. an interior) of the molded article at the low temperature TL.

Figure 4:
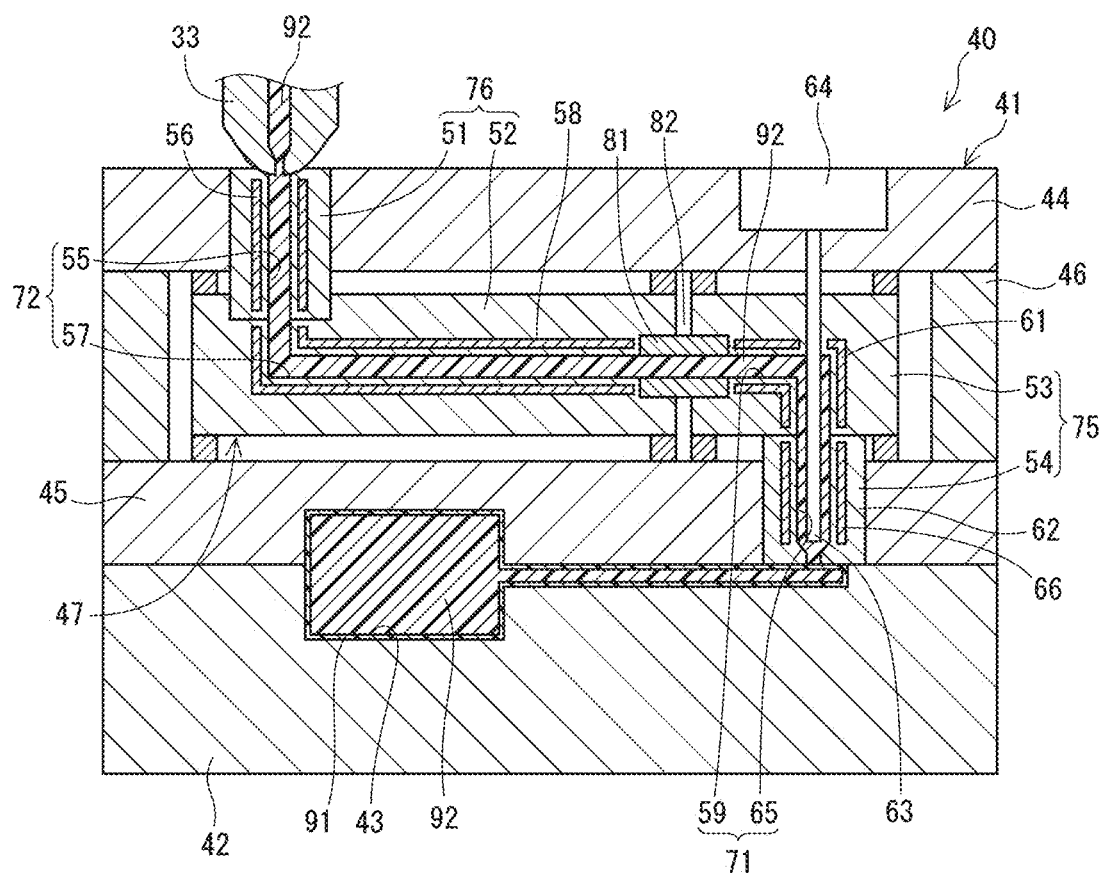
FIG. 4 is a cross-sectional view illustrating the metal mold of the first embodiment of the present disclosure when a cavity is filled with the molten resin.
Figure 5:
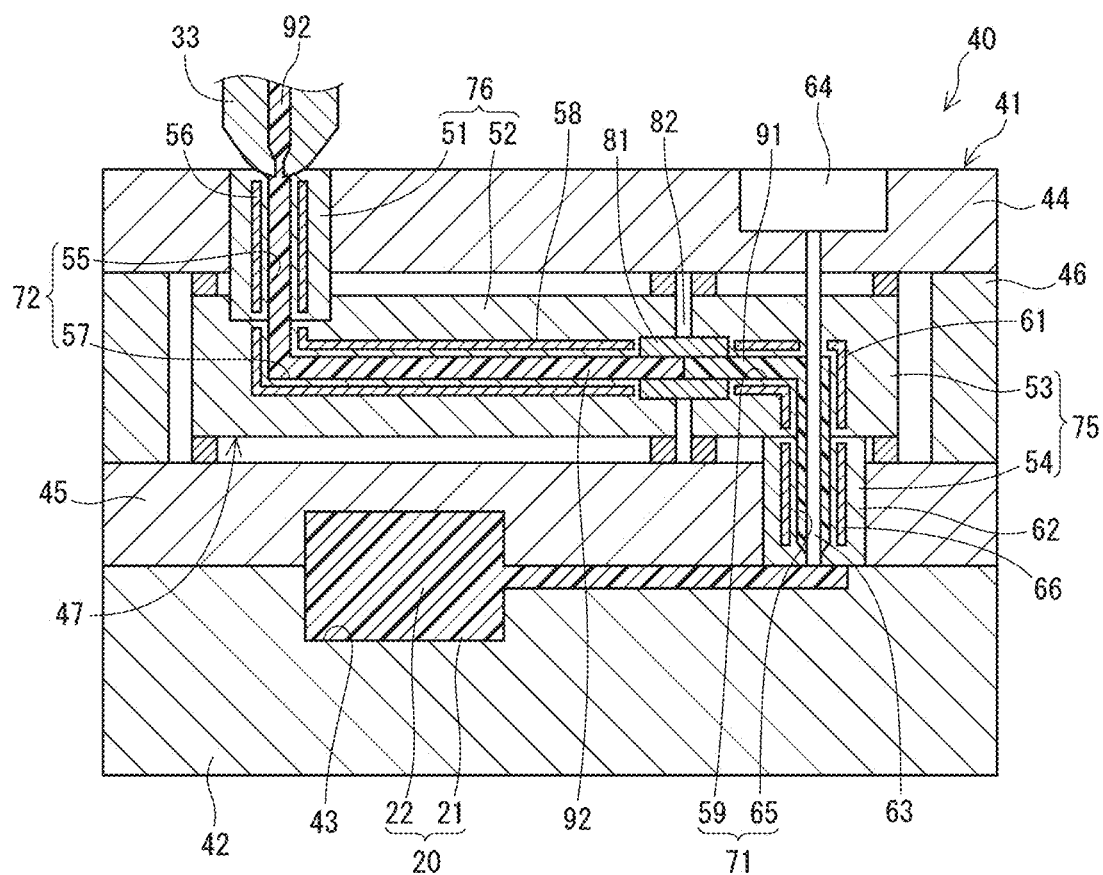
FIG. 5 is a cross-sectional view illustrating the metal mold of the first embodiment of the present disclosure when the molten resin in the cavity is solidified.

As illustrated in FIGS. 3 and 4, by pumping out a single shot of molten resin from the nozzle 33 to the second flow channel 72 and the first flow channel 71 in order, the injection section 32 (see FIG. 1) pushes out a high-temperature resin 91 in the first flow channel 71 to the cavity 43 in advance, and subsequently pushes out a low temperature resin 92 in the second flow channel 72 to the cavity 43. As illustrated in FIG. 5, the resin is filled and solidified in the cavity 43 thereby becoming a molded article 20.

Figure 6:
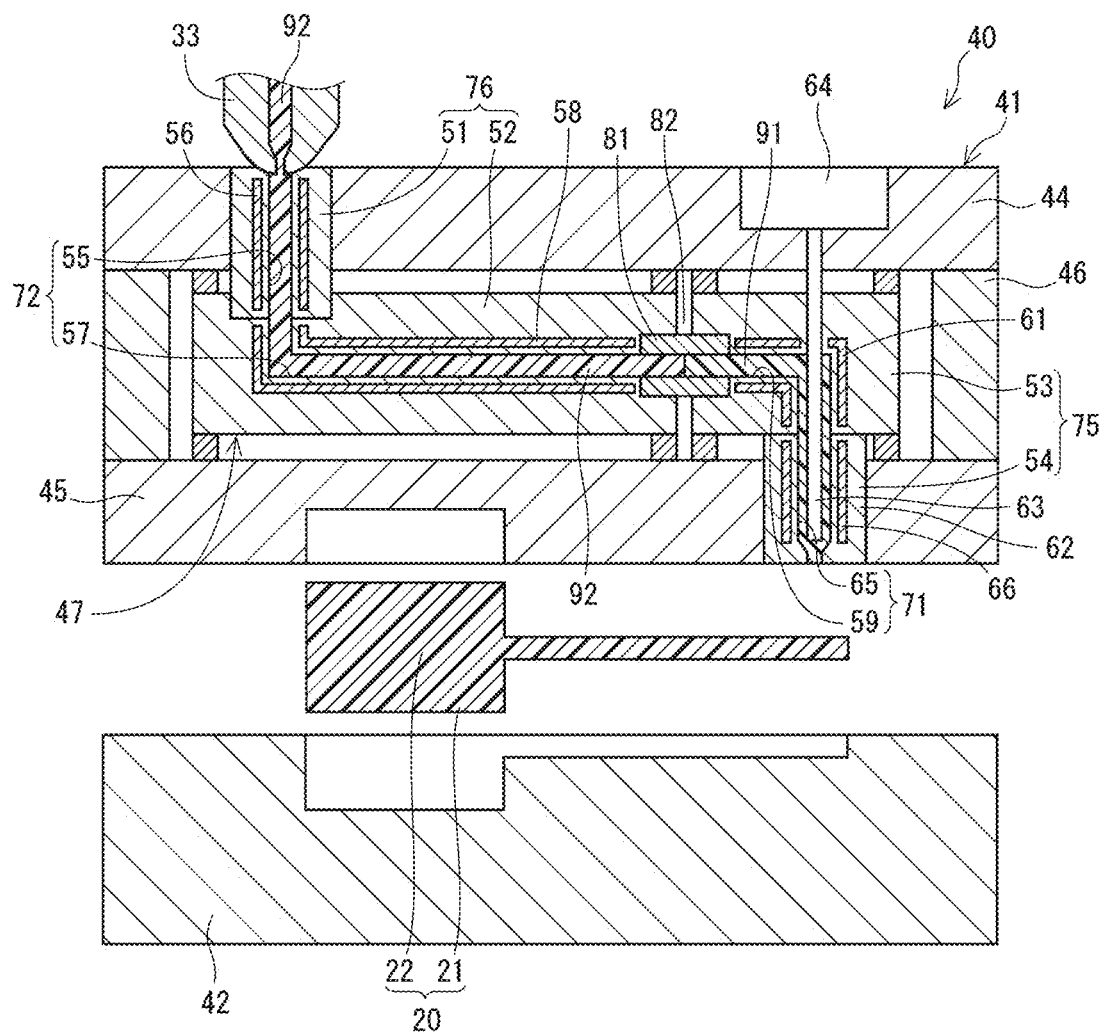
FIG. 6 is a cross-sectional view illustrating the metal mold of the first embodiment of the present disclosure when the metal mold is open.

The high-temperature flow channel section 75 is enabled to warm the low temperature resin 92 until the high temperature TH within a given period of time calculated by summing up a cooling period of time for cooling and solidifying the resin as illustrated in FIG. 5 after the cavity 43 is filled with resin as illustrated in FIG. 4, a mold opening period of time for opening the metal mold 40 and ejecting the molded article 20 as illustrated in FIG. 6, and a metal mold closing period of time for closing the metal mold 40 as illustrated in FIG. 3. In this embodiment of the present disclosure, the low temperature resin 92 is warmed until the high temperature TH within the total of the cooling period of time and the mold opening period of time, for example.

The warming manifold 53 is connected to the heat retention manifold 52 through a connection section 81. Between the warming manifold 53 and the heat retention manifold 52, a void 82 is provided excluding a position of the connection section 81. The void 82 suppresses heat transfer between the warming manifold 53 and the heat retention manifold 52. In other words, the void 82 acts as a heat-transfer suppression section.

Now, a system of manufacturing a molded article by using an injection molding machine 10 is described. The injection molding machine 10 manufactures a molded article by repeating the following first to fourth processes. A cycle of molding molded articles with the manufacturing system starts when the first process starts and ends when the fourth process is completed.

First, a metal mold closing process is described. As illustrated in FIG. 3, the metal mold 40 is closed in a metal mold closing process. It is supposed that when the mold closing process starts, the low temperature resin 92 remaining in the second flow channel 72 and the high temperature resin 91 remaining in the first flow channel 71 during the last molding cycle exist as are.

Secondly, in an injection process, as illustrated in FIG. 4, molten resin is successively injected from the first flow channel 71 and second flow channel 72 connected with each other in order into the cavity 43. At this moment, high-temperature resin 91 existing in the first flow channel 71 is injected into the cavity 43 in advance as a part of a single shot of molten resin to later form a skin layer 21 of a molded article 20 (see FIG. 6). Further, low temperature resin 92 existing in the second flow channel 72 is subsequently injected into the cavity 43 as another part of the single shot of molten resin to later form a core layer 22 of the molded article 20 (see FIG. 6).

In the injection process, since a single shot of molten resin is fed from the nozzle 33 to the second flow channel 72 and the first flow channel 71 in this order, the high-temperature resin 91 in the first flow channel 71 is pushed out in advance to the cavity 43, and the low temperature resin 92 in the second flow channel 72 pushed out to the cavity 43 thereafter. In other words, in the injection process, the high temperature resin 91 located in the heat retention flow channel 57 and the sprue flow channel 55, and the low temperature resin 92 located in the valve flow channel 65 and the warming flow channel 59 are almost pushed by the low temperature resin 92 emitted from the nozzle 33 thereby being filled into the cavity 43 in this order.

Figure 7:
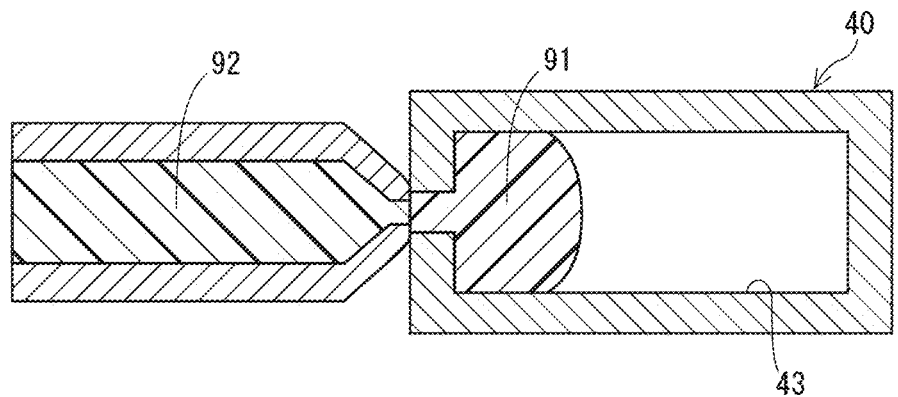
FIG. 7 is a diagram schematically illustrating exemplary behavior of molten resin in an initial stage of filling during an injection process.
Figure 8:
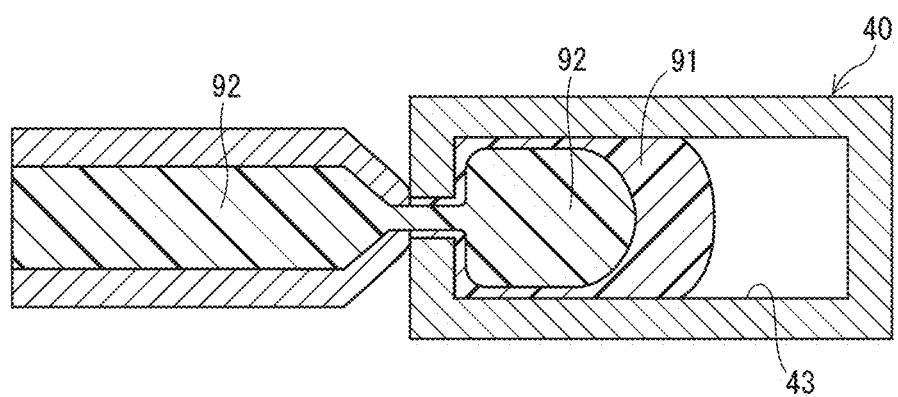
FIG. 8 is a diagram schematically illustrating exemplary behavior of the molten resin in a medium stage of filling during the injection process.
Figure 9:
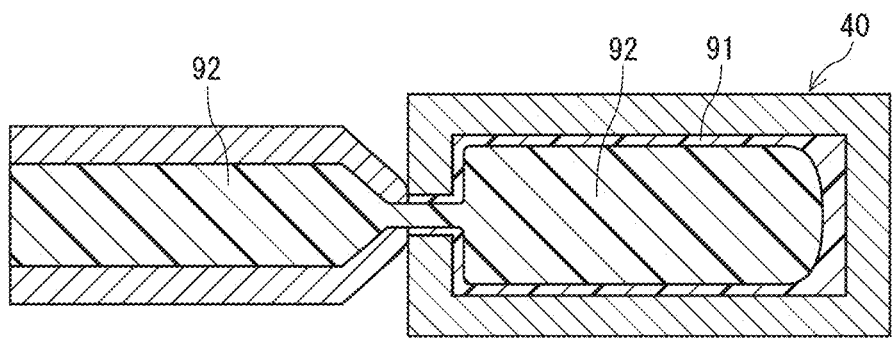
FIG. 9 is a diagram schematically illustrating exemplary behavior of the molten resin during the injection process when the molten resin is completely filled.

It is known as a filling behavior of molten resin shown during the injection process that the molten resin almost gushes out from near a thickness center at a tip of a flow thereof. Such a filling behavior is called a fountain flow. The filling behavior is now described with reference to a schematic diagram. First, as illustrated in FIG. 7, a high-temperature resin 91 flows into the cavity 43 in advance. Then, as illustrated in FIG. 8, a low temperature resin 92 coming thereafter passes through a center portion of the cavity 43 while pushing the precedent high temperature resin 91. The high-temperature resin 91 is then pushed by the low temperature resin 92 and spreads toward an inner surface (i.e. a transfer surface) of the cavity 43. In the end, as illustrated in FIG. 9, the high temperature resin 91 filled in the cavity 43 forms a skin layer 21 and the low temperature resin 92 filled in the cavity 43 forms a core layer 22.

Now, an exemplary cooling process executed while warming resin shot next time until high-temperature is described herein below. As illustrated in FIG. 5, in the cooling process, the gate 54 is closed and the resin filled in the cavity 43 is cooled while resin pushed out next time in advance is warmed until a high temperature TH. Here, the resin pushed out next time in advance means low temperature resin 92 located in the valve flow channel 65 and the warming flow channel 59 when the injection process is terminated.

Figure 10:
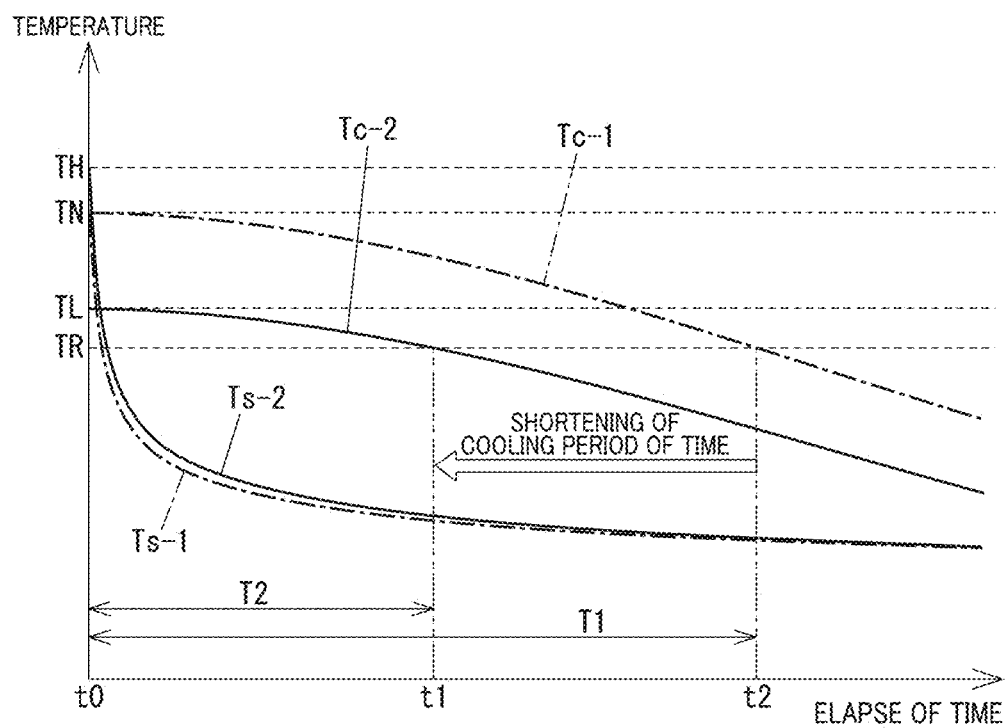
FIG. 10 is a diagram schematically illustrating an exemplary change in temperature of the resin in the cavity during the cooling process.

Now, a change in temperature of resin stored in the cavity 43 during a cooling process is described in comparison to a comparative example. In the comparative exam, all of molten resin filled into the cavity has a normal temperature TN. As illustrated in FIG. 10, in the comparative example, a temperature TS-1 of the skin layer becomes a takeout allowable temperature TR or less shortly after a time t0. The takeout allowable temperature TR is near a melting temperature, at which a molded article is removable from a metal mold, for example. Further, a temperature Tc-1 of the deepest portion of the core layer becomes the takeout allowable temperature TR or less at a time t2 when a solidification time T1 has elapsed after the time t0.

By contrast, according to the first embodiment of the present disclosure, a temperature Ts-2 of the skin layer becomes the takeout allowable temperature TR or less soon after the time t0. Further, since an initial value of a temperature Tc-2 of the deepest portion of the core layer (of the first embodiment) is set lower than an initial value of a temperature Tc-1 of the comparative example, the temperature Tc-2 of the deepest portion of the core layer becomes the takeout allowable temperature TR or less at a time t1 when a solidification time T2 shorter than the solidification time T1 has elapsed. Hence, in the first embodiment of the present disclosure, the cooling process can be more shortened than that that in the comparative example by an amount of time difference (T1–T2) between the solidification times T1 and T2. The above-described time difference (T1–T2) varies depending on a shape of the molded article and a type of resin as used or the like.

Now, an exemplary mold opening process executed while warming resin until high-temperature for the next shot is described. In the mold opening process, as illustrated in FIG. 6, the metal mold 40 is opened and a molded article 20 is ejected. In this process, resin to be pushed out next time in advance is successively warmed until a high temperature TH.

As described heretofore, according to the first implementation of the present disclosure, during the injection process, molten resin is successively injected into the cavity 43 of the metal mold 40 from the first flow channel 71 and the second flow channel 72 connected with each other in this order. High-temperature resin 91 existing in the first flow channel 71 is injected in advance into the cavity 43 as a part of a single shot of the molten resin to later form the skin layer 21 of the molded article 20. Further, low temperature resin 92 near the flowable limit existing in the second flow channel 72 is subsequently injected into the cavity 43 as another part of the single shot of the molten resin to later form a core layer 22 of the molded article 20.

According to the manufacturing system, since a temperature of molten resin that later forms a core layer of the injection molded article is controlled to be a low level near the flowable limit, a time for solidifying resin after it is injected into the cavity can be reduced. Hence, a molding cycle can be shortened. Further, a temperature of molten resin that later forms a skin layer of the injection-molded article is controlled to be a higher level, generation of an injection molded article having a defective appearance can be suppressed.

Further, according to the first embodiment of the present disclosure, by sending single shot of the molten resin from the injection section 32 to the second flow channel 72 and the first flow channel 71 in this order in the injection process, the high temperature resin 91 in the first flow channel 71 is pushed out into the cavity 43 in advance, and subsequently the low temperature resin in the second flow channel 72 is pushed out into the cavity 43. Thus, since the high temperature resin 91 and the low temperature resin 92 can be injected into the cavity 43 in order by simply injecting the single shot without switching channels and supply sources or the like, the molding cycle can be shortened.

Further, according to the first embodiment of the present disclosure, the manufacturing system includes: a mold closing process of closing a metal mold 40 as a previous process executed prior to an injection process; a cooling process of cooling resin injected into the cavity 43 as a post injection process; and a mold opening process of opening the metal mold 40 and ejecting a molded article 20 after the cooling process is ejected. In the cooling process and the mold opening process, molten resin located in a flow channel just before the cavity 43, i.e., the first flow channel 71, is warmed until a high temperature TH. As a result, without additionally imposing a process of warming the resin to be injected into the cavity 43 next time in advance until the hot temperature TH, a high-temperature resin 91 can be prepared in parallel to the existing process.

Further, according to the first embodiment of the present disclosure, a fixed mold 41 of the molding metal mold (40) includes the high-temperature flow channel section 75 and the low temperature flow channel section 76. The high temperature flow channel section 75 includes the first flow channel 71 located just before the cavity 43 of the metal mold 40 and is enabled to warm the molten resin injected in an early stage as a part of a single shot of molten resin to later form a skin layer 21 of the molded article 20 until the high temperature TH. The low temperature flow channel section 76 includes the second flow channel 72 connected to the first flow channel 71 to reserve heat of molten resin injected after the early stage as another part of the single shot of molten resin to later form the core layer 22 of the injection molded article 20 at the low temperature TL near the flowable limit.

According to the injection molding machine 10, since a low temperature TL near the flowable limit is set as a temperature of a molten resin to later form a core layer 22 of a molded article 20, a solidification time for solidifying resin injected into the cavity can be reduced. As a result, a molding cycle can be shortened. Further, since molten resin to form a skin layer 21 of a molded article 20 is warmed until a relatively high temperature, generation of a molded article 20 having a defective appearance can be suppressed.

Further, according to the first embodiment of the present disclosure, the injection molding machine 10 includes the injection section 32 acting as a supply source of molten resin. By sending a single shot of molten resin to the second flow channel 72 and the first flow channel 71 in order, the molten resin supply source pushes out the high-temperature resin 91 in the first flow channel 71 in advance and the low temperature resin 92 in the second flow channel 72 subsequently to the cavity 43. Thus, since the high temperature resin 91 and the low temperature resin 92 can be injected into the cavity 43 in order by simply injecting the single shot without switching channels and supply sources or the like, the molding cycle can be shortened.

Further, according to the first embodiment of the present disclosure, the high-temperature flow channel section 75 is enabled to warm the low temperature resin 92 until the high temperature TH within a given period of time calculated by summing up a cooling period of time for cooling the resin filled in the cavity 43, a period of time for opening the metal mold 40 and ejecting the molded article 20, and a period of time for closing the metal mold 40. Hence, even if a waiting time for warming resin injected next time into the cavity 43 in advance until a high temperature TH is not employed, high-temperature resin 91 can be prepared in parallel with an existing operation within an existing operation period of time.

Further, according to the first embodiment of the present disclosure, since the low temperature flow channel section 76 includes the heat retention manifold 52 and the high temperature flow channel section 75 includes the warming manifold 53, high-temperature resin 91 and low temperature resin 92 injected next time into the cavity 43 can be prepared in the hot runner unit 47. Further, since the hot runner unit 47 can be preferably placed, for example, in accordance with a layout between the injection section 32 and the molded article 20, degree of design freedom increases.

Further, according to the first embodiment of the present disclosure, the void 82 is provided between the warming manifold 53 and the heat retention manifold 52 to suppress heat-transfer from the warming manifold 53 to the heat retention manifold 52. This can maintain a difference in temperature between the high-temperature resin 91 and the low temperature resin 92.

Figure 11:
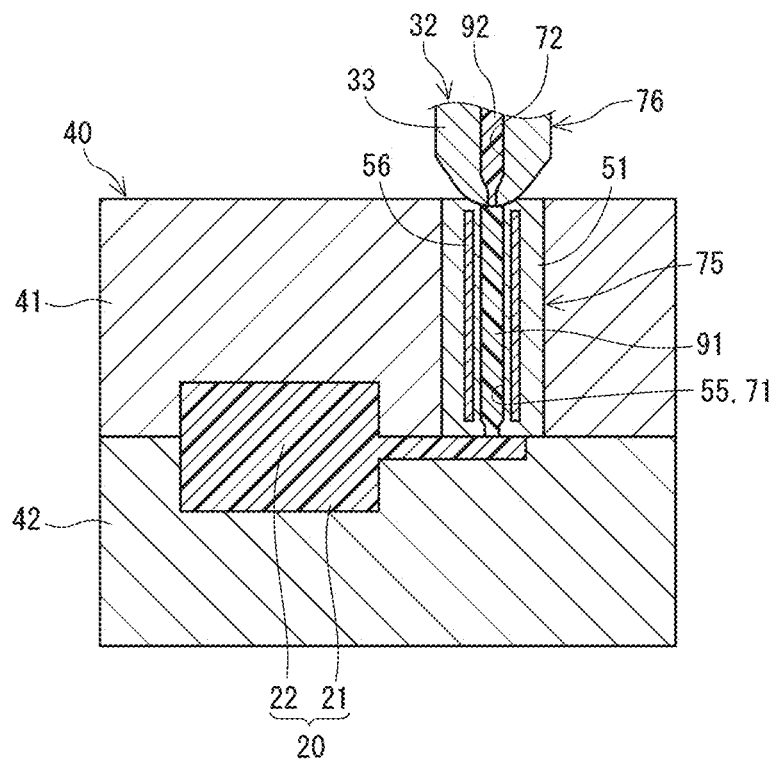
FIG. 11 is a cross-sectional view illustrating a metal mold of a second embodiment of the present disclosure.

Now, a second embodiment of the present disclosure is described. In a second embodiment of the present disclosure, as illustrated in FIG. 11, the high temperature flow channel section 75 is a sprue 51, and the first flow channel 71 is a sprue flow channel 55. The low temperature flow channel section 76 is the injection section 32, and the second flow channel 72 is a flow channel formed in the nozzle 33 and the injection section 32 connected to the nozzle 33. Remaining configurations of the second embodiment of the present disclosure are similar to configurations of the first embodiment of the present disclosure, and are accordingly possible to obtain the similar advantages as obtained by the first embodiment of the present disclosure. Further, according to the second embodiment of the present disclosure, the metal mold 40 can be smaller, thereby downsizing a molding system.

Another embodiment is herein below described. As a yet another embodiment of the present disclosure, resin to be pushed out next time in advance can be warmed until a high temperature during either one of the cooling process, the mold opening process, and the mold closing process or all of the processes. Further, in the other embodiment of the present invention, resin to be pushed out next time in advance can be warmed until a high temperature in either one of the cooling period of time, the mold opening period of time, and the mold closing period of time or all of operation periods of time.

According to yet another embodiment of the present inventions, since the present invention is not limited to the void, the transmission suppression control section may be composed of a heat insulator or the like.

The present invention is not limited to the above-described embodiments and can be implemented in various manners not deviating from a point of the present invention.

Numerous additional modifications and variations of the present disclosure are possible in light of the above teachings. It is therefore to be understood that within the scope of the appended claims, the present disclosure may be executed otherwise than as specifically described herein. For example, the system of manufacturing an injection-molded article is not limited to the above-described various embodiments and may be altered as appropriate. Similarly, the mold is not limited to the above-described various embodiments and may be altered as appropriate.

What is claimed is:

1. A method of manufacturing an injection-molded article by using a single injection manifold having first and second flow channels serially connected between an injection nozzle and a cavity formed in a metal mold to provide single injection, the second flow channel being located downstream of the injection nozzle, the first flow channel being continuously connected to a downstream end of the second flow channel and located upstream of the cavity;

the method comprising the steps of:

injecting a single shot of molten resin from the injection nozzle into the second flow channel and the first flow channel in this order;

heating a first part of the single shot of molten resin to a prescribed high level in the first flow channel;

keeping temperature of a second part of the single shot of molten resin in a prescribed second level near a flowable limit of molten resin lower than the prescribed high level in the second flow channel;

ejecting the first and second parts of the single shot of molten resin into the cavity in this order by newly injecting a next single shot of molten resin from the injection nozzle into the second flow channel and the first flow channel in this order; and forming a skin layer of the injection molded article with the first part of the single shot of molten resin and a core layer of the injection molded article with the second part of the single shot of molten resin in the cavity by generating a fountain flow in the cavity with the first and second parts of the single shot of the molten resin based on a difference in temperature between the first and second parts of the single shot of molten resin.

2. The method of claim 1, further comprising the steps of:

cooling the injection molded article after the step of forming the skin layer and the core layer of the injection molded article;

opening the metal mold and the cavity;

removing the injection molded article from the cavity;

closing the metal mold and the cavity as a preparation for the next injection molding after the step of removing the injection molded article; and heating a first part of the next single shot of molten resin newly injected from the injection nozzle in the first flow channel during one of the three steps of opening the metal mold and the cavity, removing the injection molded article, and closing the metal mold and the cavity.

* * * * *